July 15, 1958  M. LANDMAN ET AL  2,843,224
AUXILIARY BUMPER IMPACT ABSORBER
Filed May 25, 1954  2 Sheets-Sheet 1
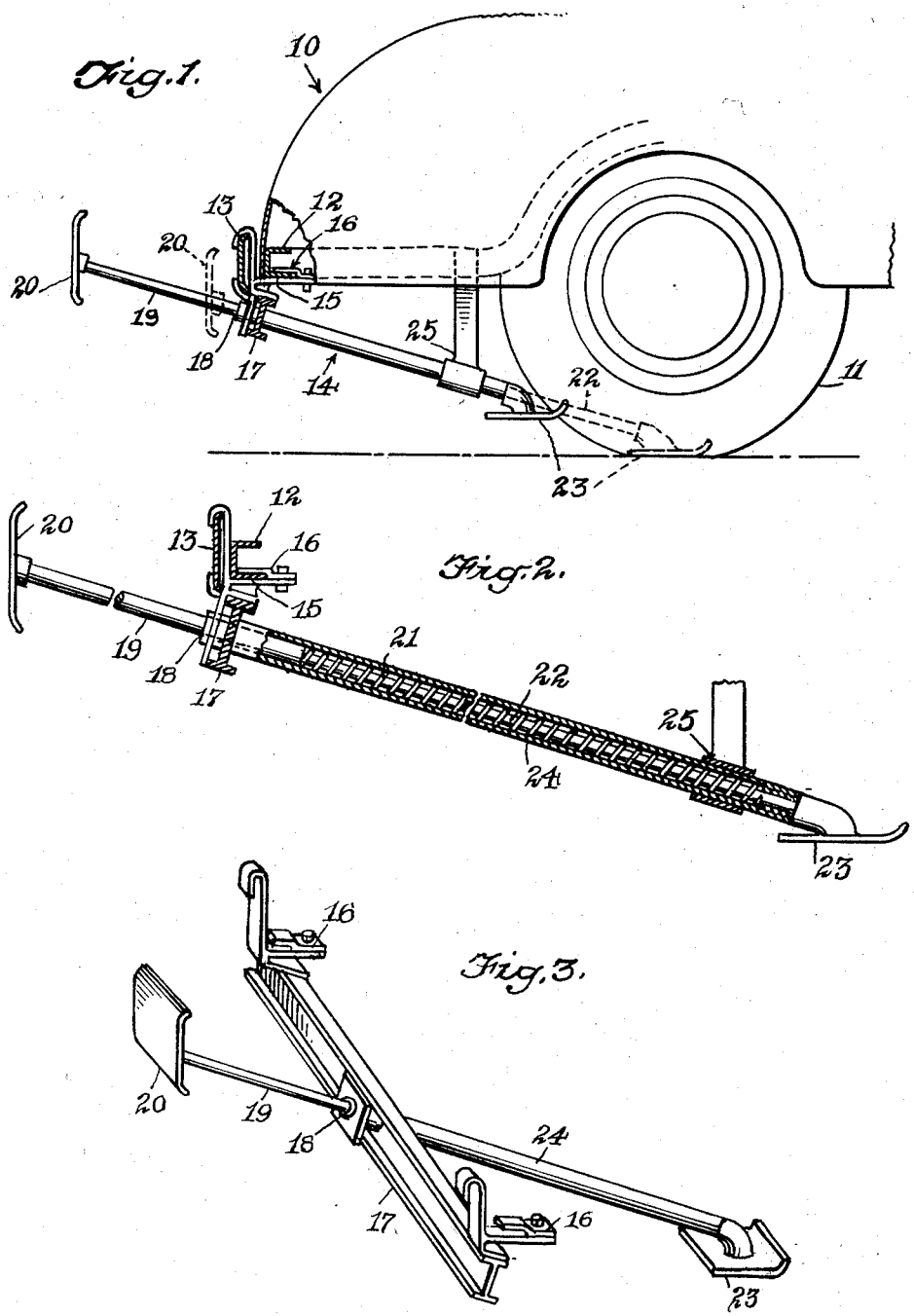
INVENTORS
Max Landman, Joseph Newman
and Herman Landman
BY Munn, Liddy, Nathanson & Merch
ATTORNEYS

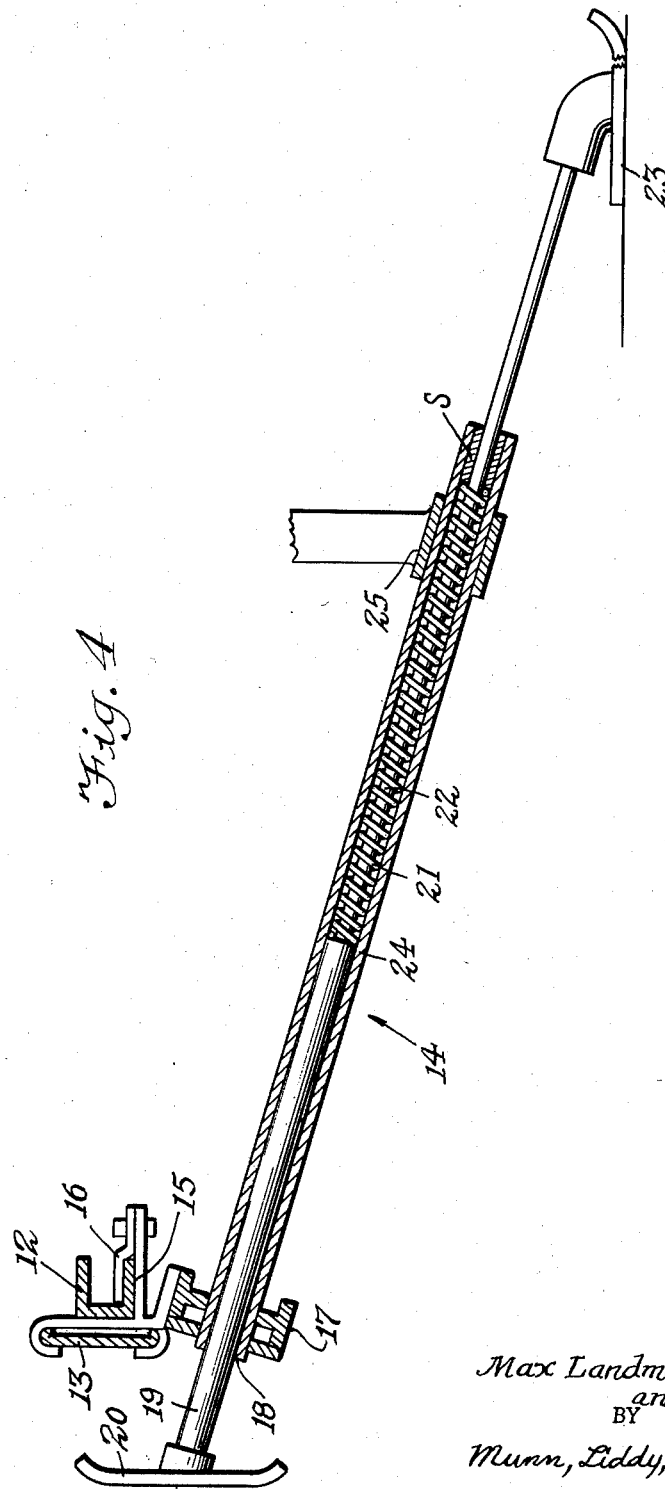

United States Patent Office 2,843,224
Patented July 15, 1958

2,843,224

AUXILIARY BUMPER IMPACT ABSORBER

Max Landman and Joseph Newman, Flushing, and Herman Landman, Brooklyn, N. Y.

Application May 25, 1954, Serial No. 432,128

2 Claims. (Cl. 188—5)

This invention relates to an impact absorber for vehicles, and more particularly to an impact absorber for cushioning the impact caused when vehicles collide in so-called rear end or head-on collisions.

At the present time it is well-known that accidents causing the greatest injury and damage occur when one vehicle strikes another travelling in the same direction or collides with another vehicle coming from the opposite direction.

It is an object of the present invention to provide means which will minimize the shock when a vehicle is struck from the rear or when such a vehicle collides with another in a head-on collision.

It is still a further object of the present invention to provide means of the character described which may be applied without great difficulty to vehicles presently in use.

It is still a further object of the present invention to provide means of the character described having all the desired advantages which is nevertheless inexpensive to manufacture and simple to construct.

Other objects and advantages are set forth in greater detail in the accompanying specification taken in conjunction with the accompanying drawings, in which:

Fig. 1 is a side view of a vehicle chassis of the present invention partly in section showing the impact absorber of the present invention in operative position;

Fig. 2 is a longitudinal sectional view of the impact absorber of the present invention; and Fig. 3 is a perspective view of the impact absorber of the present invention.

Fig. 4 is a view partly in axial section and partly in side elevation, similar to Fig. 2 but showing the impact absorber of the present invention in its operative position.

Referring to the drawings, there is shown in Fig. 1 the rear portion of an automobile 10 showing one of the rear wheels 11 and a portion of the chassis 12 together with the conventional bumper 13 extending from the rear of the vehicle. In the past in collisions of vehicles, the front portion of the colliding vehicle strikes the bumper 13 causing the shock to pass through the entire vehicle and thrusting the vehicle forward and, in many instances, great damage is caused thereby. According to the present invention there is provided an impact absorber 14 which is preferably secured to flange 15 of the chassis 12 by means of a clip 16. While this securing means has been shown for exemplary purposes, any other means for securing the impact absorber may, of course, be utilized.

The impact absorber is provided with an I-beam 17 which has an opening intermediate its ends. Extending through the opening is one end of a metal sleeve 18 in which bears a shaft 19 of sturdy durable construction. Secured to one extremity of the shaft 19 is a metallic plate 20. Within the sleeve 18 a strong coiled spring 21 is provided, one end of which abuts the lower end of the shaft 19. Extending through the sleeve 18 and through the coiled spring 21 is a metal rod 22 attached at one end to the shaft 19. Secured to the other end of rod 22 is a brake member 23 which is disposed in such fashion as to be at an angle to the axis of the rod itself. The coiled spring 21 engages a shoulder in the sleeve 18 at the lower end thereof, and normally urges the shaft 19 and rod 22 upward and to the left. The sleeve 18 has its main body portion designated 24, which is secured, as shown, to the under part of the chassis and the bumper. The shoulder in the sleeve 18 at the lower end thereof, which is engaged by the lower end of the coil spring 21, is designated "S" in Fig. 4. There is provided a bracket 25 secured to the underpart of the chassis to support the forward portion of the impact absorber, as shown in Fig. 1.

The impact absorber of the present invention normally is carried in the position shown in Fig. 2 and in solid lines in Fig. 1. However, when a collision occurs, the impact of the colliding vehicle against the plate 20 urges the shaft 19 and rod 22 forward. The impact is cushioned by the pressure of the shaft 19 against the coiled spring 21. The forward movement of the shaft and rod continues, to urge the road-contacting member 23 against the ground. At this point and because of the disposition and angle of the member 23, it drags along the ground tending to cause the colliding vehicle to come to a stop. It will be noted that the plate 20 also functions to prevent the colliding vehicle to come to a stop. It will be noted that the plate 20 also functions to prevent the colliding vehicle from striking the bottom portion of the vehicle which is struck. The coiled spring 21 reduces the shock or impact of the collision on the vehicle struck or the occupants of the same, the impact of the shock being largely passed on through the rod 22 and the member 23 to the ground. It will be understood that the vehicle struck is allowed to be urged forwardly a short distance by the collision whereby sudden stops are not effected.

It has been found that when the impact absorber of the present invention is used, the damage to the colliding vehicle itself is also substantially lessened.

While for clarity the impact absorber has been described as being secured to the chassis, it will be understood that it may function in a vehicle whose rear bumper is extended out from the body portion so that the plate 20, shaft 19 and shoe member 23 can be arranged through an aperture in the bumper itself. The impact absorber of the present invention is shown and described as being on the rear of a vehicle. However, it will be understood that it may be used on the front of a vehicle as well by simply reversing the device and securing the attachment to the front part of the chassis or through the front bumper. In this construction the impact absorber will function to absorb the shock and stop reverse movement of the vehicles in head-on collisions and will also prevent the front end of a colliding car from being damaged in a rear-end collision.

While I have described the invention in some detail, it will be understood that variations and modifications may be made without departing from the spirit of the invention or the scope of the appended claims.

We claim:

1. The combination with a vehicle having a bumper at its rear thereof, of a road surface contacting elongate and structurally rigid impact transmitting member, an impact receiving plate mounted at one end of said impact transmitting member, a shoe provided with a friction surface rigidly affixed to the other end of said impact transmitting member, support means mounting said impact transmitting member, plate, and shoe on the vehicle with said impact transmitting member being disposed at an angle with respect to the road surface for straight line movement in a vertical plane parallel to the longitudinal axis of the vehicle between a road contacting projected position and a retracted inoperative position, with said plate being disposed at the level of said bumper and positioned to the rear of said bumper, said impact transmitting member extending longitudinally under and downwardly toward the front of said vehicle, said shoe being positioned at the lower end of said transmitting member, and said friction surface being positioned horizontally and parallel to the road surface, said impact receiving plate being adapted to transmit impacts to said transmitting member for moving said impact transmitting member downwardly along is length and said shoe into frictional contact with said road surface, resilient means acting on the impact transmitting member and the vehicle, and yieldingly retaining said impact receiving plate and shoe, and said transmitting member in said retracted position.

2. The combination with a vehicle having a bumper at its rear thereof, of a road surface contacting elongate and structurally rigid impact transmitting bar, an impact receiving plate angularly mounted at one end of said impact transmitting bar, a shoe provided with a friction surface rigidly affixed at an angle to the other end of said impact transmitting bar, support means comprising an elongate sleeve mounting said impact transmitting bar, plate, and shoe on the vehicle with said impact transmitting bar being disposed at an angle with respect to the road surface for straight line movement in a vertical plane parallel to the longitudinal axis of the vehicle between a road contacting projecting position and a retracted inoperative position, with said plate being disposed at the level of said bumper and positioned to the rear of said bumper, said transmitting bar extending longitudinally under and downwardly toward the front of said vehicle, said shoe being positioned at the lower end of said transmitting bar, and said friction surface being positioned horizontally and parallel to the road surface, said impact receiving plate being adapted to transmit impacts to said transmitting bar for moving said impact transmitting bar downwardly along its length and said shoe into frictional contact with said road surface, resilient means comprising an elongate compression coil spring in said sleeve acting between the impact transmitting bar and a shoulder adjacent the lower end of said sleeve to yieldably retain said impact receiving plate and shoe, and said transmitting bar in said retracted position.

References Cited in the file of this patent

UNITED STATES PATENTS

| | | |
|---|---|---|
| 1,495,916 | McNames | May 27, 1924 |
| 1,619,823 | Klein | Mar. 8, 1927 |
| 2,066,468 | Grigas | Jan. 5, 1937 |
| 2,630,961 | Burg | Mar. 10, 1953 |